United States Patent
Choi et al.

(10) Patent No.: US 9,305,335 B2
(45) Date of Patent: Apr. 5, 2016

(54) DISPLAY APPARATUS AND NPR PROCESSING METHOD APPLIED THERETO

(75) Inventors: Hye-rin Choi, Suwon-si (KR); Sang-kyun Im, Seoul (KR); Dong-wook Kim, Suwon-si (KR); Min-jung Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 660 days.

(21) Appl. No.: 13/162,717

(22) Filed: Jun. 17, 2011

(65) Prior Publication Data
US 2011/0310114 A1 Dec. 22, 2011

(30) Foreign Application Priority Data
Jun. 17, 2010 (KR) .............................. 2010-0057663

(51) Int. Cl.
G09G 5/02 (2006.01)
G06T 5/00 (2006.01)
G06T 5/20 (2006.01)
H04N 1/60 (2006.01)
G06T 5/40 (2006.01)
G06T 11/00 (2006.01)

(52) U.S. Cl.
CPC ................ G06T 5/002 (2013.01); G06T 5/009 (2013.01); G06T 5/20 (2013.01); G06T 5/40 (2013.01); G06T 11/001 (2013.01); H04N 1/6027 (2013.01); G06T 2207/10024 (2013.01); G06T 2207/20028 (2013.01); G06T 2207/20192 (2013.01)

(58) Field of Classification Search
None
See application file for complete search history.

(56) References Cited

U.S. PATENT DOCUMENTS

| | | | |
|---|---|---|---|
| 2003/0053690 A1* | 3/2003 | Trifonov ................... G06T 5/40 382/168 |
| 2004/0056859 A1* | 3/2004 | Ohba et al. ..................... 345/426 |
| 2005/0190121 A1* | 9/2005 | An .................................. 345/60 |
| 2007/0041636 A1 | 2/2007 | Yoon et al. |
| 2007/0154110 A1* | 7/2007 | Wen et al. ...................... 382/276 |
| 2009/0027732 A1* | 1/2009 | Imai .............................. 358/3.27 |
| 2009/0154841 A1* | 6/2009 | Choi et al. ...................... 382/307 |

(Continued)

FOREIGN PATENT DOCUMENTS

| | | |
|---|---|---|
| EP | 2034436 A1 | 3/2009 |
| KR | 10-2009-0065204 A | 6/2009 |
| WO | 2009/030596 A1 | 3/2009 |
| WO | 2009/072207 A1 | 6/2009 |

OTHER PUBLICATIONS

Majumder, Aditi; Gopi, M.; "Hardware accelerated real time charcoal rendering," 2002, NPAR '02 Proceedings of the 2nd international symposium on Non-photorealistic animation and rendering, pp. 59-66.*

(Continued)

Primary Examiner — Kee M Tung
Assistant Examiner — Frank Chen
(74) Attorney, Agent, or Firm — Sughrue Mion, PLLC

(57) ABSTRACT

A display apparatus and a Non-Photorealistic Rendering process (NPR) are provided. The display apparatus includes: an image processor which processes an NPR with respect to an image so that brightness of a pixel having a brightness value less than a predetermined brightness value is reduced and a brightness of a pixel having a brightness value greater than the predetermined brightness value is increased. Accordingly, a cartoon effect can be maximized.

24 Claims, 14 Drawing Sheets
(4 of 14 Drawing Sheet(s) Filed in Color)

(56) References Cited

U.S. PATENT DOCUMENTS

2010/0158406 A1* 6/2010 Kim et al. .................... 382/266
2010/0254623 A1 10/2010 Yu et al.
2011/0115815 A1* 5/2011 Xu et al. ....................... 345/626

OTHER PUBLICATIONS

Lu, Aidong; Morris, Christopher J.; Tyalor, Joe; Ebert David S.; Hansen, Charles; Rehingans, Penny; Hartner, Mark; "Illustrative Interactive Stipple Rendering," Apr.-Jun. 2003, IEEE, Transactions on Visualization and Computer Graphics, vol. 9 No. 2, pp. 127-138.*

Akshay Loke, "The Amazing Cartoon Maker CIS 665 Project Design Document", University of Pennsylvania, total 9 pages.

Adobe After Effects CS4, "Cartoon effect", Retrieved online on Sep. 13, 2010, total 5 pages, http://help.adobe.com/en_US/AfterEffects/9.0/WS66C4ED50-08A9-416b-A91F-7F3 . . . .

Winnemoller, et al.; "Real-Time Video Abstraction", ACM Transactions on Graphics, Jul. 2006, vol. 25, No. 3, 6 pages total.

Communication dated Mar. 4, 2015, issued by the European Patent Office in counterpart European Application No. 11170391.4.

* cited by examiner

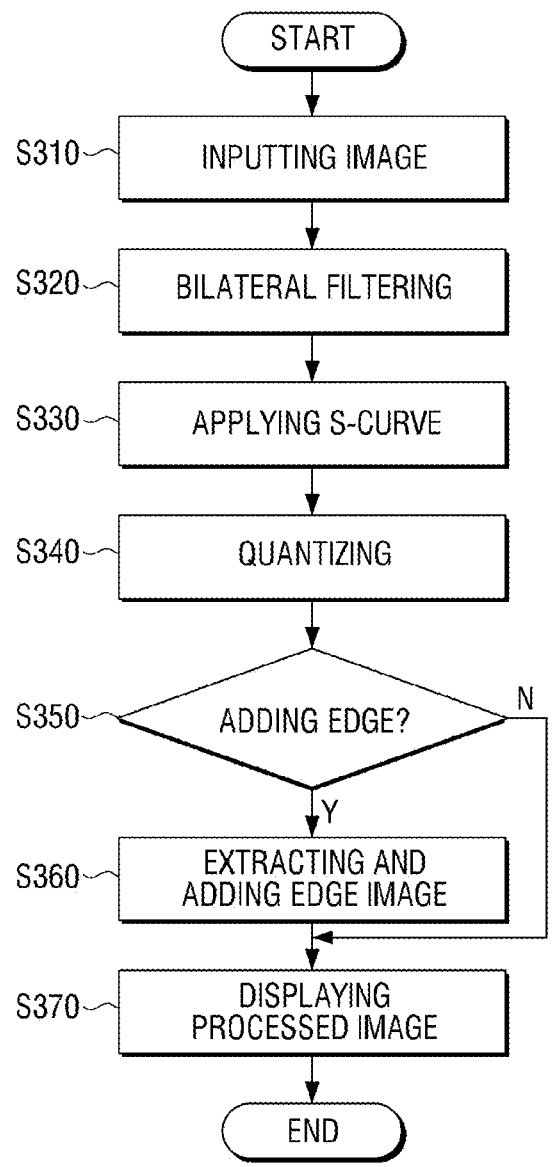

Input Image

Bilateral Filter Coefficient

Resulting Image

[Dark Image]

[Median Brightness Image]

DISPLAY APPARATUS AND NPR PROCESSING METHOD APPLIED THERETO

CROSS-REFERENCE TO RELATED APPLICATION

This application claims priority from Korean Patent Application No. 10-2010-0057663, filed on Jun. 17, 2010 in the Korean Intellectual Property Office, the disclosure of which is incorporated herein by reference in its entirety.

BACKGROUND

1. Field

Exemplary embodiments relate to a display apparatus and a Non-Photorealistic Rendering (NPR) processing method applied to the same, and more particularly, to a display apparatus which processes NPR with respect to an input image and displays the NPR-processed image, and an NPR processing method applied to the same.

2. Description of the Related Art

In recent years, a display apparatus has become able to support additional operations besides its original operation of displaying photos or images. A representative additional operation is a Non-Photorealistic Rendering (NPR) operation.

The NPR is an image processing technique that does not process a photo as is, but processes the photo non-realistically by applying diverse effects to the photo. In contrast to a realistic expression of an object, the NPR-processed expression exaggerates a trivial object or drastically omits an unimportant object in order to highlight a subject. Such an NPR technique is widely used in gaming, animation, advertisements, movies, etc.

The NPR includes various methods to perform a non-realistic rendering process with respect to an input image. For example, the NPR includes a method of rendering a photo in a colored pencil drawing style, a pen drawing style, an oil painting style, a watercolor printing style, a cartoon style, and a sketch style.

Among such NPR methods, diverse methods for rendering an input photo image in a cartoon style have been suggested. However, a related art NPR method for rendering an image in a cartoon style processes a large amount of data, causing a slow processing rate, and a cartoon effect is not as clear as may be desired.

Therefore, there is a demand for an NPR method for maximizing a cartoon effect.

SUMMARY

One or more exemplary embodiments provide a display apparatus which processes an image so that brightness of a pixel having a brightness value less than a predetermined brightness value is reduced and brightness of a pixel having a brightness value greater than the predetermined brightness value is increased, and a Non-Photorealistic Rendering (NPR) processing method applied to the same.

According to an aspect of an exemplary embodiment, there is provided a display apparatus including: an image processor which processes an NPR with respect to an image; and a display unit which displays the NPR-processed image, wherein the image processor processes the NPR by reducing a brightness of a pixel having a brightness value less than a predetermined brightness value among pixels of the image and increasing a brightness of a pixel having a brightness value greater than the predetermined brightness value.

The image processor may process the NPR using an S-curve which is based on the predetermined brightness value, so that the brightness of the pixel having the brightness value less than the predetermined brightness value is reduced and the brightness of the pixel having the brightness value greater than the predetermined brightness value is increased.

The image processor may determine the predetermined brightness value according to an average brightness value of a frame of the image.

The image processor may increase at least one of a contrast value and a saturation value of the image by reducing the brightness of the pixel having the brightness value less than the predetermined brightness value and increasing the brightness of the pixel having the brightness value greater than the predetermined brightness value.

The image processor may include: a bilateral filter which filters the image to abstract the image; an S-curve unit which applies an S-curve to the image so that a brightness of a pixel having a brightness value less than the predetermined brightness value among pixels of the filtered image is reduced and a brightness of a pixel having a brightness value greater than the predetermined brightness value is increased; a quantization unit which quantizes the S-curve applied image so that the S-curve applied image includes a plurality of brightness levels; and an edge processor which extracts an edge image from the S-curve applied image and adds the extracted edge image to the quantized image.

The quantization unit may apply a quantization curve including a plurality of gamma curves to the S-curve applied image so that the S-curve applied image includes the plurality of brightness levels.

The quantization unit may quantize the S-curve applied image by applying a quantization curve according to:

$$Y = 2^Q \times (MOD(X, 2^Q)/2^Q)^\gamma + FLOOR(X/2^Q),$$

where X is an input signal (Iin(x)), Y is an output signal (Iout(x)), Q is a quantization factor, $\gamma$ is a gamma value for determining a gamma curve of each section, MOD(A,B) is a function for calculating a remainder of A/B, and FLOOR (C) is a function for making an integer by rounding down below the decimal point.

The edge processor may adjust a strength of an edge by applying a weight set by a user.

The edge processor may adjust a strength of an edge according to a brightness of an original image.

The edge processor may apply a weight to an edge and may adjust a strength of the edge according to a brightness of an original image, by applying to the extracted edge image:

$$Y = X \times (LV_{max} - w_e \times E)/LV_{max},$$

where X is an input signal (Iin(x)), Y is an output signal (Iout(x)), $LV_{max}$ is a maximum level value of the input signal and the output signal, $w_e$ is a weight for adjusting an edge strength, and E is an edge greater than a threshold.

According to an aspect of another exemplary embodiment, there is provided an NPR processing method, including: processing an NPR with respect to an image; and displaying the NPR-processed image, wherein the processing the NPR comprises reducing a brightness of a pixel having a brightness value less than a predetermined brightness value among pixels of the image and increasing a brightness of a pixel having a brightness value greater than the predetermined brightness value.

The processing the NPR may include processing the NPR using an S-curve which is based on the predetermined brightness value so that the brightness of the pixel having the brightness value less than the predetermined brightness value is reduced and the brightness of the pixel having the brightness value greater than the predetermined brightness value is increased.

The processing the NPR may include determining the predetermined brightness value according to an average brightness value of a frame of the image.

The processing the NPR may include increasing at least one of a contrast value and a saturation value of the image by reducing the brightness of the pixel having the brightness value less than the predetermined brightness value and increasing the brightness of the pixel having the brightness value greater than the predetermined brightness value.

The processing the NPR may include: bilateral-filtering the image to abstract the image; applying an S-curve to the filtered image so that a brightness of a pixel having a brightness value less than the predetermined brightness value among pixels of the filtered image is reduced and a brightness of a pixel having a brightness value greater than the predetermined brightness value is increased; quantizing the image so that the S-curve applied image includes a plurality of brightness levels; and processing an edge by extracting an edge image from the S-curve applied image and adding the extracted edge image to the quantized image.

The quantizing may include applying a quantization curve including a plurality of gamma curves to the S-curve applied image so that the S-curve applied image includes the plurality of brightness levels.

The quantizing may include quantizing the S-curve applied image by applying a quantization curve according to:

$$Y = 2^Q \times (MOD(X, 2^Q)/2^Q)^\gamma + FLOOR(X/2^Q),$$

wherein X is an input signal (Iin(x)), Y is an output signal (Iout(x)), Q is a quantization factor, $\gamma$ is a gamma value for determining a gamma curve of each section, MOD(A,B) is a function for calculating a remainder of A/B, and FLOOR (C) is a function for making an integer by rounding down below the decimal point.

The processing the edge may include adjusting a strength of the edge by applying a weight set by a user.

The processing the edge may adjust a strength of the edge according to brightness of an original image.

The processing the edge may include applying a weight to the edge and adjusting a strength of the edge according to a brightness of an original image, by applying to the extracted edge image:

$$Y = X \times (LV_{max} - w_e \times E)/LV_{max},$$

where X is an input signal (Iin(x)), Y is an output signal (Iout(x)), $LV_{max}$ is a maximum level value of the input signal and the output signal, $w_e$ is a weight for adjusting an edge strength, and E is an edge greater than a threshold.

According to an aspect of another exemplary embodiment, there is provided a non-photorealistic rendering (NPR) processing method, including: processing an NPR with respect to an image; and outputting the NPR-processed image to be displayed, wherein the processing the NPR includes reducing a brightness of a pixel, among pixels of the image, having a brightness value less than a predetermined brightness value and increasing a brightness of a pixel, among the pixels of the image, having a brightness value greater than the predetermined brightness value.

According to one or more exemplary embodiments as described above, a display apparatus which processes an image so that a brightness of a pixel having a brightness value less than a predetermined brightness value is reduced and a brightness of a pixel having a brightness value greater than the predetermined brightness value is increased, and an NPR processing method applied to the same are provided so that a cartoon effect can be maximized.

In particular, the display apparatus may apply an S-curve, thereby increasing a saturation and a contrast of an input image and thus displaying a nonrealistic and bright photo.

Additional aspects and advantages will be set forth in the detailed description, will be obvious from the detailed description, or may be learned by practicing the exemplary embodiments.

BRIEF DESCRIPTION OF THE DRAWINGS

The patent or application file contains at least one drawing executed in color. Copies of this patent or patent application publication with color drawing(s) will be provided by the Office upon request or payment of the necessary fee.

The above and/or other aspects will be more apparent by describing in detail exemplary embodiments, with reference to the accompanying drawings in which:

FIG. 3 is a flowchart to explain a non-photorealistic rendering (NPR) processing method according to an exemplary embodiment;

DETAILED DESCRIPTION OF THE EXEMPLARY EMBODIMENTS

Figure 1:
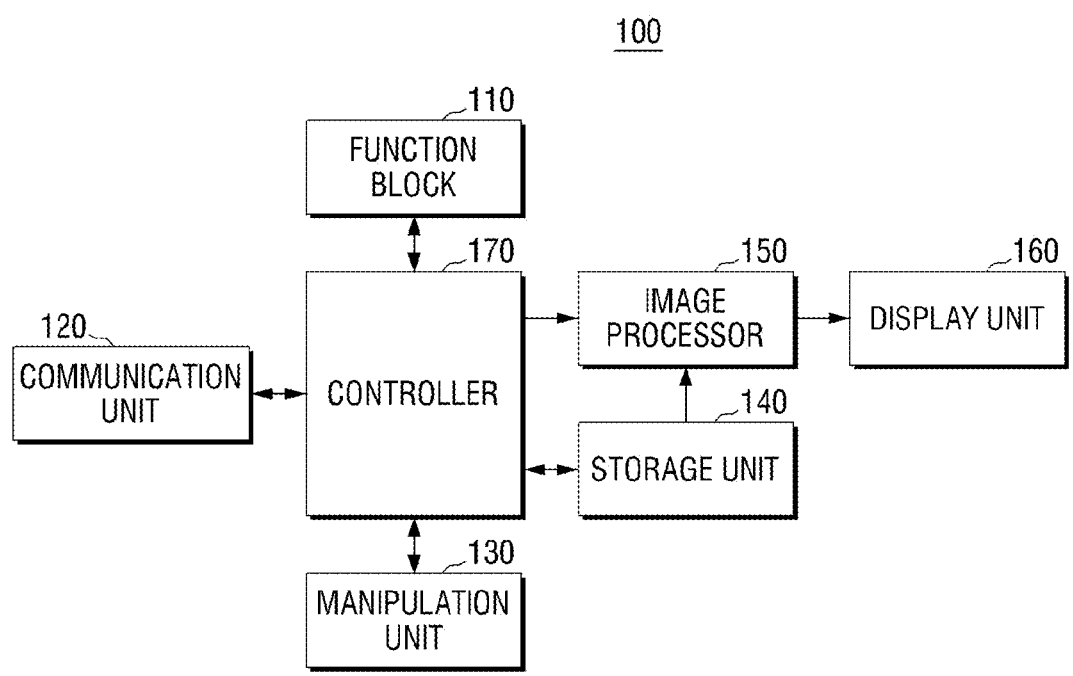
FIG. 1 is a block diagram illustrating a digital photo frame according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail. Hereinafter, expressions such as "at least one of," when preceding a list of elements, modify the entire list of elements and do not modify the individual elements of the list.

FIG. 1 is a block diagram illustrating a digital photo frame 100 according to an exemplary embodiment. Referring to FIG. 1, the digital photo frame 100 includes an operation block 110, a communication unit 120, a manipulation unit 130, a storage unit 140, an image processor 150, a display unit 160, and a controller 170.

The operation block 110 performs a first operation of the digital photo frame 100. For example, the operation block 110 may reproduce an image (such as a photo or a moving picture).

The communication unit 120 is communicably connected to an external apparatus, for example, through a mobile communication network or the Internet. The communication unit 120 may download image contents from the external apparatus.

The manipulation unit 130 receives a user's manipulation to input a user command. Specifically, the manipulation unit 130 receives a manipulation corresponding to a selecting command on diverse items displayed on a screen from a user. The manipulation unit 130 may be realized as at least one of a touch screen, a button, a mouse, a touch pad, a remote controller, a rotatable dial, etc.

The storage unit 140 stores programs and applications for performing the first operation of the digital photo frame 100. Also, the storage unit 140 may store image data.

The image processor 150 image-processes input image data and outputs the image-processed image data to the display unit 160. The image processor 150 may process Non-Photorealistic Rendering (NPR) in order to express the input image in a cartoon style.

The image processor 150 performs the NPR process by reducing a brightness of a pixel having a brightness value less than a predetermined brightness value and increasing a brightness of a pixel having a brightness value greater than the predetermined brightness value. Such a process is to maximize a cartoon effect by increasing at least one of saturation and contrast of the input image.

The input image may include an image signal or image data that is input from an external source or an image signal or image data that is input to the image processor 150 from the storage unit 140.

By way of example, the image processor 150 processes the image using an S-curve which is based on a predetermined brightness value, so that a brightness of a pixel having a brightness value less than the predetermined brightness value is reduced and a brightness of a pixel having a brightness value greater than the predetermined brightness value is increased. The image processor 150 may determine the predetermined brightness value according to an average brightness value of one frame of the image.

A detailed structure and operation of the image processor 150 according to an exemplary embodiment will be described below with reference to FIG. 2.

The display unit 160 displays the image processed by the image processor 150 on a screen. The display unit 160 may display the image using a Liquid Crystal Display (LCD), a Plasma Display Panel (PDP), an Active Matrix Organic Light Emitting Diode (AMOLED), etc.

The controller 170 controls an overall operation of the digital photo frame 100 according to, for example, a user's manipulation input through the manipulation unit 130.

Hereinafter, a detailed structure and operation of an image processor 150 according to an exemplary embodiment will be explained in detail with reference to FIG. 2. FIG. 2 is a block diagram illustrating an image processor 150 according to an exemplary embodiment. The image processor 150 performs at least one of processes, such as bilateral filtering, applying an S-curve for representing a non-realistic color sense, applying a quantization curve for representing a contour, and adding an edge to the image, in order to add a cartoon effect to the image.

Figure 2:
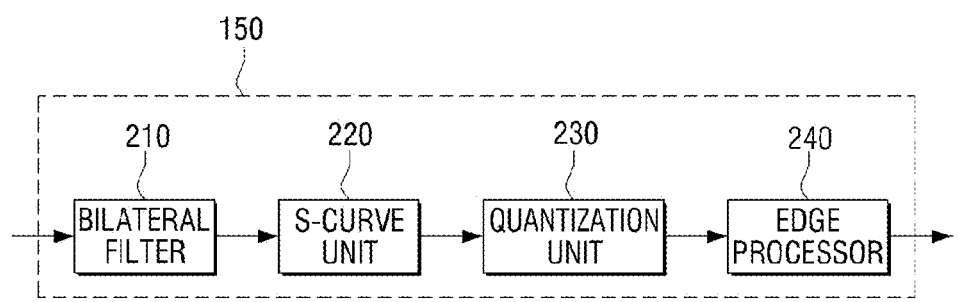
FIG. 2 is a block diagram illustrating an image processor according to an exemplary embodiment.

Referring to FIG. 2, the image processor 150 includes a bilateral filter 210, an S-curve unit 220, a quantization unit 230, and an edge processor 240.

The bilateral filter 210 filters the image in order to abstract the image. By way of example, the bilateral filter 210 is a nonlinear filter that smoothes an image while preserving an edge and has a characteristic that a filter coefficient is changed according to a distribution of brightness of pixels. Using such a characteristic, the bilateral filter 210 abstracts or simplifies the image by reducing changes in a detailed portion of the image while preserving an edge of the input image.

Figure 4A:
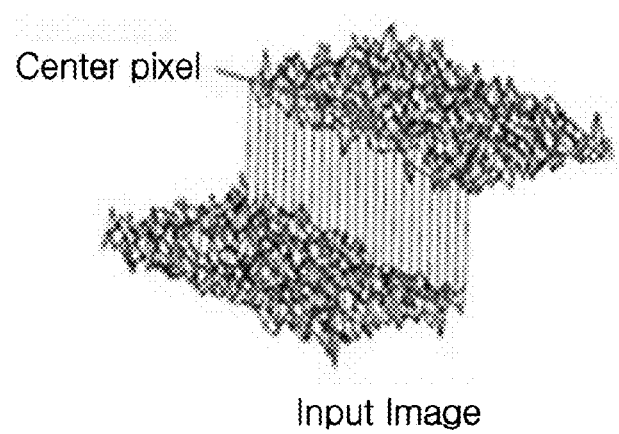
FIGS. 4A to 4C are views illustrating a result of bilateral filtering according to an exemplary embodiment.
Figure 4B:
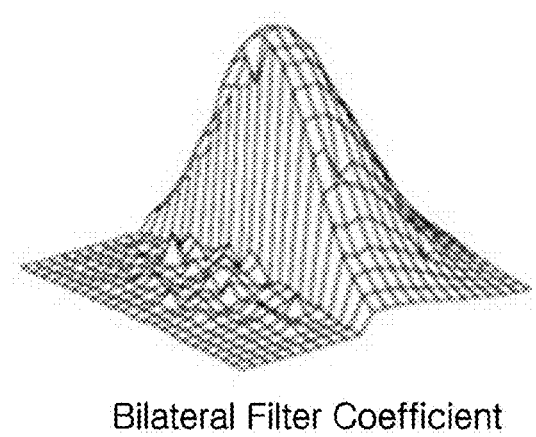
Figure 4C:
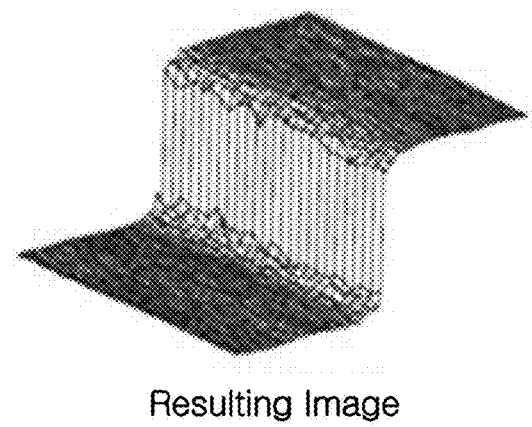

An image processing operation of the bilateral filter 210 according to an exemplary embodiment will now be explained with reference to FIGS. 4A to 4C. FIGS. 4A to 4C are views illustrating a result of bilateral filtering according to an exemplary embodiment.

FIG. 4A illustrates a distribution of signals of an input image. FIG. 4B is a schematic view of a bilateral filter coefficient at a pixel (i.e., a point referred to as "center pixel") of an image including noise around an edge with respect to the input image signal as shown in FIG. 4A.

As shown in FIG. 4B, the bilateral filter coefficient has a general smoothing filter coefficient with respect to a pixel having similar brightness to that of the center pixel. On the other hand, the bilateral filter coefficient has a coefficient close to zero with respect to a pixel having brightness greatly different from that of the center pixel.

Accordingly, by applying the bilateral filter having the bilateral filter coefficient shown in FIG. 4B, a resulting image in which an edge is preserved and a remaining part is smoothed is obtained as shown in FIG. 4C.

The bilateral filter coefficient may be calculated by the product of a coefficient ($w_s$) that is determined by a distance between the center pixel (x) and a neighboring pixel ($\epsilon$) and a coefficient ($w_r$) that is determined by a difference between a brightness ($I_{in}(x)$) of the center pixel and a brightness ($I_{in}(\epsilon)$) of the neighboring pixel, as expressed in the following exemplary Formula 1. The denominator of Formula 1 is to normalize such that the sum of filter coefficients is equal to 1.

$$I_{out}(x) = \frac{\sum_{\varepsilon \in M} I_{in}(\varepsilon) w_s(\varepsilon, x) w_r(\varepsilon, x)}{\sum_{\varepsilon \in M} w_s(\varepsilon, x) w_r(\varepsilon, x)}. \quad \text{[Formula 1]}$$

In Formula 1, $w_s$ is a function a value of which increases as the neighboring pixel gets closer to the center pixel, and $w_r$ is any function a value of which increases as a brightness difference over the center pixel decreases. For example, if f(x) is defined as a function a value of which increases as an x value decreases, f(x) is a general Gaussian filter, and a first linear filter and $w_s$ and $w_r$ are defined as following exemplary Formula 2:

$w_s(\epsilon, x) = f(\epsilon - x)$ $w_r(\epsilon, x) = f(I_{in}(\epsilon) - I_{in}(x))$● [Formula]

Using the above-described characteristic of the bilateral filter 210, the bilateral filter 210 is able to abstract the image.

The S-curve unit 220 applies an S-curve to the filtered image so that a brightness of a pixel having a brightness value less than a predetermined brightness value is reduced and a brightness of a pixel having a brightness value greater than the predetermined brightness value is increased.

The S-curve is an S-shaped graph showing a relationship of an output signal against an input signal. A point at which the input signal and the output signal have a same value is a reference point of the S-curve. With respect to an x value below the reference point, a y value is lower than the x value. Furthermore, with respect to an x value above the reference point, a y value is higher than the x value.

Accordingly, if the S-curve unit 220 applies the S-curve to the brightness value of the filtered image, brightness of a pixel having a brightness values less than the predetermined brightness value is reduced and brightness of a pixel having a brightness value greater than the predetermined brightness value is increased.

The S-curve unit 220 sets the reference brightness value (that is, the predetermined brightness value) of the S-curve differently according to an average brightness value of one scene of the image. For example, if the average brightness value is low, the S-curve unit 220 sets the reference brightness value to be low, and if the average brightness value is high, the S-curve unit 220 sets the reference brightness value to be high. Thus, the S-curve unit 220 sets the reference brightness value to be higher as the average brightness value increases. The S-curve according to one or more exemplary embodiments may be as illustrated in FIGS. 5A to 5C.

Figure 5A:
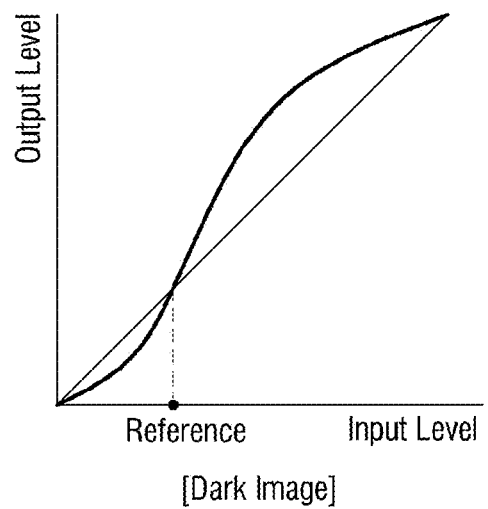
FIGS. 5A to 5C are views illustrating shapes of S-curves according to a brightness of an image according to an exemplary embodiment.
Figure 5B:
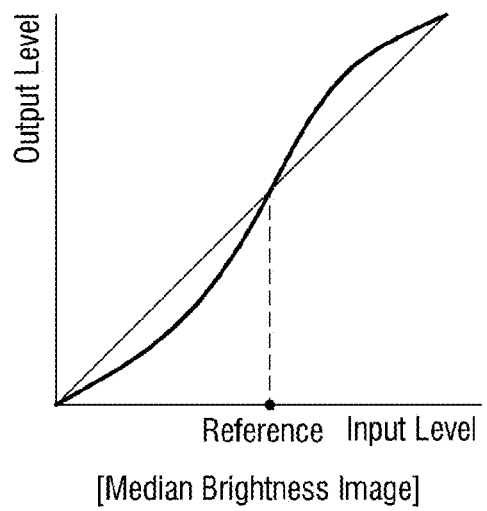
Figure 5C:
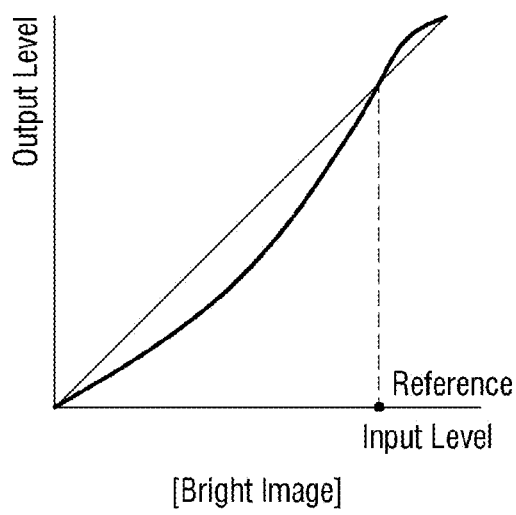

FIGS. 5A to 5C are views illustrating shapes of S-curves according a brightness of an image according to an exemplary embodiment. Referring to FIGS. 5A to 5C, the reference brightness value increases as the brightness of the image increases.

As described above, since the S-curve unit 220 applies the S-curve to the filtered image, the image processor 150 increases the contrast of the image to at least an extent that the color sense is distorted and the saturation of the image is increased. Through this process, the image processor 150 expresses the color sense of the image non-realistically and brightly, thereby enhancing a cartoon effect.

Referring back to FIG. 2, the quantization unit 230 performs quantization with respect to the S-curve applied image so that the image includes a plurality of brightness levels. In a cartoon, a contour in which color is expressed may discontinuously appear even in an area other than an edge. In order to cause such a contour to appear, the quantization unit 230 applies a quantization curve to the input image.

The quantization curve may include a plurality of gamma curves. The gamma curve may include a plurality of brightness levels. That is, the quantization curve may include a plurality of level sections and each level section may correspond to one gamma curve. In other words, the quantization curve may be a step-wise curve including a plurality of gamma curves. The quantization curve may be expressed by the following exemplary Formula 3:

$$Y=2^Q\times(MOD(X,2^Q)/2^Q)^\gamma+FLOOR(X/2^Q),\qquad\text{[Formula 3]}$$

where X is an input signal (Iin(x)), Y is an output signal (Iout(x)), Q is a quantization factor, $\gamma$ is a gamma value for determining a gamma curve of each section, MOD(A,B) is a function for calculating a remainder of A/B, and FLOOR (C) is a function for making an integer by rounding down below the decimal point.

Figure 6A:
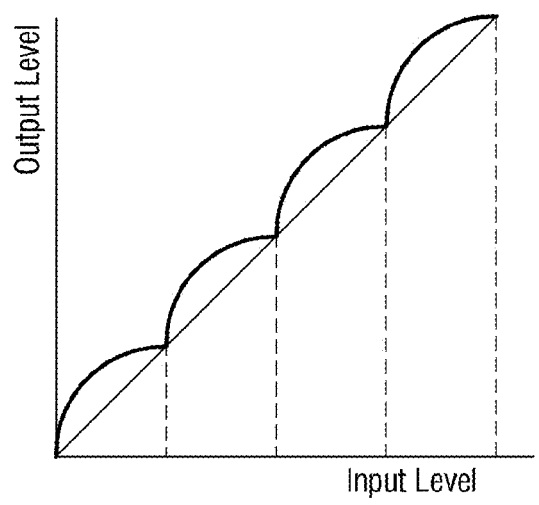
FIGS. 6A and 6B are views illustrating shapes of quantization curves according to gamma values according to an exemplary embodiment.
Figure 6B:
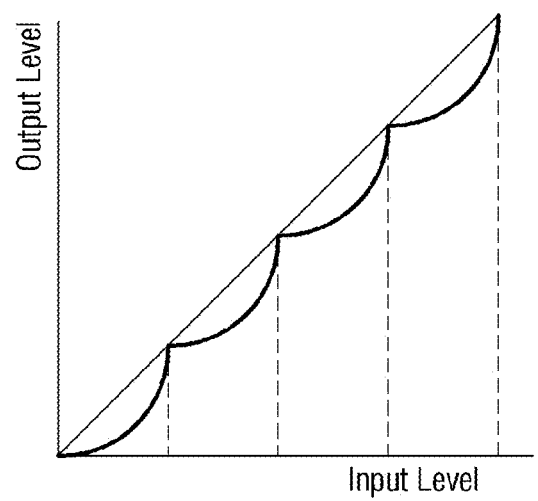

Exemplary shapes of the quantization curve are illustrated in FIGS. 6A and 6B. FIGS. 6A and 6B are views illustrating shapes of the quantization curve according to gamma values according to an exemplary embodiment. FIG. 6A illustrates a case in which a gamma value is less than 1 and FIG. 6B illustrates a case in which a gamma value is greater than 1. According to the present exemplary embodiment, in a case that the gamma value is less than 1, the quantization curve includes gamma curves bulging outward above the quantization curve, and in a case that the gamma value is greater than 1, the quantization curve includes gamma curves hollowed inward below the quantization curve.

Also, referring to FIGS. 6A and 6B, an input brightness level is divided into four sections and the quantization curve includes four gamma curves, though it is understood that another exemplary embodiment is not limited thereto. That is, the quantization curve according to another exemplary embodiment may include various numbers of sections.

As described above, the quantization curve includes the plurality of level sections and each section corresponds to the gamma curve.

By quantizing the S-curve applied image into the plurality of brightness level sections, the quantization unit 230 expresses a contour that is a discontinuous color surface on the image.

A related art quantizing method has a drawback that the number of expressible grayscales is reduced since the quantization is achieved by cutting a lower bit of the input signal. However, since the quantization unit 230 realizes the quantization curve using the gamma curve, unlike in the related art quantization method, the image processor 150 can process the image so that the contour can be generated without reducing the number of expressible grayscales. Accordingly, if the above-described quantizing method is applied, the image processor 150 can express a softer contour.

The edge processor 240 extracts an edge image from the S-curve applied image and adds the extracted edge image to the quantized image. For example, the edge processor 240 may apply a weight set by a user through a manipulation unit 130 to adjust a strength of an edge. The weight refers to a value that determines the strength of the edge (that is, sharpness of an edge in the edge image) and may be set by the user. As the weight increases, the strength of the edge image is higher and thus the edge is sharper, so that the cartoon effect is more reinforced.

When extracting the edge, the edge processor 240 uses the S-curve applied image, i.e., the image before the quantization is applied. An edge value may be extracted using a 3×3 Sobel mask. The edge processor 240 may multiply an edge strength ($w_e$) by an edge (E) greater than a threshold as in following exemplary Formula 4:

$$Y=X\times(LV_{max}-w_e\times E)/LV_{max},\qquad\text{[Formula 4]}$$

where X is an input signal (Iin(x)), Y is an output signal (Iout(x)), $LV_{max}$ is a maximum level value of an input and output signal, $w_e$ is a weight for adjusting an edge strength, and E is an edge greater than a threshold.

The edge processor 240 adds the extracted edge image to the image output from the quantization unit 230.

Also, the edge processor 240 may adjust the strength of the edge according to a brightness of an original image. For example, referring to Formula 4, when applying the edge to the image, the edge processor 240 subtracts the edge (E) from the maximum level value (LVmax) of the input and output signal rather than simply multiplying or adding them, so that the image is expressed more clearly as the resulting value is greater. The edge processor 240 may perform normalization by dividing a difference between the maximum level value and the edge by LVmax so that the resulting value is between 0 and 1, and multiples the resulting value by the input signal so that the edge can be expressed naturally on the image.

Accordingly, the edge processor 240 is able to naturally add the edge to the quantized image in consideration of the brightness of the original image.

Through the above-described operations, the image processor 150 processes the NPR to render the input image in a cartoon style. Also, since the contrast and the saturation are enhanced by applying the S-curve, the image processor 150 can further enhance the cartoon effect.

Also, each of the bilateral filter 210, the S-curve unit 220, the quantization unit 230, and the edge processor 240 may be realized in the image processor 150 in at least one of a hardware level and a software level.

Hereinafter, a method of processing NPR in order to render an image in a cartoon style according to an exemplary embodiment will be explained with reference to FIG. 3. FIG. 3 is a flowchart illustrating an NPR processing method according to an exemplary embodiment.

Referring to FIG. 3, an image processing device (e.g., a digital photo frame 100) receives an image (operation S310). The input image may include an image signal or image data that is input from an external source or an image signal or image data that is input from a storage medium embedded in the image processing device.

The image processing device filters the image in order to abstract the image (operation S320). In order to filter the image, the image processing device uses a bilateral filter, which is a nonlinear filter supporting an operation of smoothening an image while reserving an edge. The bilateral filter has a characteristic that a filter coefficient is changed according to a distribution of brightness of pixels. Using such a characteristic of the bilateral filter, the image processing device abstracts or simplifies the image by reducing changes in a detailed portion of the image while preserving the edge of the input image. An exemplary bilateral filter has been described in detail above with reference to FIG. 2.

Using the characteristics of the bilateral filter as described above, the image processing device can abstract the image.

Furthermore, the image processing device applies an S-curve to the filtered image so that a brightness of a pixel having a brightness values less than a predetermined brightness value among pixels of the filtered image is reduced and a brightness of a pixel having a brightness value greater than the predetermined brightness value is increased (operation S330).

The S-curve is an S-shaped graph that shows a relationship of an output signal against an input signal. A point at which the input signal and the output signal have the same value is a reference point of the S-curve. With respect to an x value below the reference point, a y value is lower than the x value, and, with respect to an x value above the reference point, a y value is higher than the x value.

Accordingly, if the image processing device applies the S-curve to the brightness values of the filtered image, the brightness of the pixel less than the predetermined brightness value is reduced and the brightness of the pixel greater than the predetermined brightness value is increased.

Also, the image processing device may determine the reference brightness value (i.e., predetermined brightness value) of the S-curve differently according to an average brightness value of one scene of the image. For example, the image processing device sets the reference brightness value to be lower if the average brightness value is relatively lower and sets the reference brightness value to be higher if the average brightness value is relatively higher. Thus, the image processing device sets the reference brightness value to be higher as the average brightness value increases. Exemplary S-curves have been described above with reference to FIGS. 5A to 5C.

Since the image processing device may apply the S-curve to the filtered image as described above, the digital photo frame 100 increases the contrast of the image to at least an extent that the color sense is distorted and the saturation is increased. Through this process, the image processing device expresses the color sense of the input image non-realistically and brightly, thereby enhancing the cartoon effect.

Moreover, the image processing device performs quantization so that the S-curve-applied image includes a plurality of brightness levels (operation S340). In a cartoon, a contour in which color is expressed discontinuously appears in an area other than an edge. In order to cause such a contour to appear, the image processing device applies a quantization curve to the input image.

The quantization curve may include a plurality of gamma curves. The gamma curve may include a plurality of brightness levels. That is, the quantization curve may include a plurality of level sections and each section corresponds to one gamma curve. Accordingly, the quantization curve may be a step-wise curve including the plurality of gamma curves. Furthermore, the quantization curve may be expressed by above-described Formula 3. Exemplary shapes of the quantization curve have been described above with reference to FIGS. 6A and 6B.

As described above, by quantizing the S-curve applied image into the plurality of brightness level sections, the image processing device expresses a contour that is a discontinuous color surface on the image.

A related art quantizing method has a drawback in that a number of expressible grayscales is reduced since quantization is achieved by cutting a lower bit of the input signal. However, since the image processing device according to an exemplary embodiment realizes the quantization curve using the gamma curve, unlike in the related art quantizing method, the image processing device can process the image so that a contour is generated without reducing the number of expressible grayscales. Therefore, if the above-described quantizing method is applied, the image processing device can express a softer contour.

The image processing device determines whether an edge is to be added or not (operation S350). If the edge is not to be added (operation S350-N), the digital photo frame 100 proceeds to operation S370 without adding the edge.

On the other hand, if the edge is to be added (e.g., is set to be added) (operation S350-Y), the image processing device extracts an edge image from the S-curve applied image and adds the extracted edge image to the quantized image (operation S360).

At this time, the image processing device may apply a weight set by a user through a manipulation unit 130 to adjust a strength of an edge. The weight is a value that determines the strength of the edge (i.e., sharpness of an edge in the image) and may be set by the user. As the weight increases, the strength of the edge image increases and thus the edge is sharper, so that the cartoon effect is more reinforced.

When extracting the edge, the image processing device uses the S-curve applied image, that is, the image before the quantization is applied. An edge value may be extracted using a 3×3 Sobel mask. The image processing device multiplies an edge strength ($w_e$) by an edge (E) greater than a threshold as in above formula 4. The image processing device adds the extracted edge image to the quantized image.

Also, the image processing device may adjust the strength of the edge according to a brightness of an original image. For example, referring to exemplary Formula 4, when applying the edge to the image, the image processing device subtracts the edge (E) from the maximum level value (LVmax) of the input and output signal rather than simply multiplying or adding them, so that the image is expressed more clearly as the resulting value is greater. The image processing device may perform normalization by dividing a difference between the maximum level value and the edge by LVmax so that the resulting value is between 0 and 1, and multiples the resulting value by the input signal so that the edge can be expressed naturally on the image.

Accordingly, the image processing device is able to naturally add the edge to the quantized image in consideration of the brightness of the original image.

Also, the image processing device outputs the processed image to be displayed (operation S370).

Through the above-described operations, the image processing device can process the NPR to render the input image in a cartoon style. Also, since contrast and saturation are enhanced by applying the S-curve, the image processing device can further enhance the cartoon effect.

Hereinafter, a resulting image after the NPR is processed for rendering an image in a cartoon style according to one or more exemplary embodiments will be explained with reference to FIGS. 7A to 8B.

FIGS. 7A to 7E are views illustrating a resulting photo in respective operations of processing NPR according to an exemplary embodiment.

Figure 7A:
FIGS. 7A to 7E are views illustrating resulting photos in respective operations of performing an NPR process according to an exemplary embodiment.

FIG. 7A illustrates an input image which is an original image.

Figure 7B:

FIG. 7B illustrates a resulting image after bilateral filtering is applied to the original image. As shown in FIG. 7B, clothes and hairs of a woman are simplified in comparison with the original image.

Figure 7C:

FIG. 7C illustrates a resulting image after an S-curve is applied. As shown in FIG. 7C, in the S-curve applied image, color sense is exaggerated and saturation and contrast are enhanced in comparison with the image of FIG. 7B.

Figure 7D:

FIG. 7D illustrates a resulting image after a quantization curve is applied. As shown in FIG. 7C, a contour that is a discontinuous surface of color appears in the face and hand of the woman.

Figure 7E:

FIG. 7E illustrates an image to which an edge is added. As shown in FIG. 7E, by adding the edge, the cartoon effect is further enhanced.

Figure 8A:
FIGS. 8A and 8B are views illustrating photos after and before performing the NPR process according to an exemplary embodiment.
Figure 8B:

FIGS. 8A and 8B are views illustrating photos before and after an NPR is processed according to an exemplary embodiment. FIG. 8A illustrates an original image and FIG. 8B illustrates a resulting image after the NPR is processed for expressing a cartoon effect.

If the NPR is processed as shown in FIG. 8B, the effect of rendering the photo in the cartoon style is further enhanced.

In the above-described exemplary embodiments, a digital photo frame 100 has been explained as a display apparatus, but this is merely an example. An exemplary embodiment can be applied to any image processing apparatus that can process the NPR with respect to an input image and output a resulting image to be displayed. For example, the image processing device may be a digital camera, a camcorder, a portable multimedia player (PMP), an MP3 player, a mobile phone, a laptop computer, a personal digital assistant (PDA), etc.

While not restricted thereto, an exemplary embodiment can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as one or more computer programs transmitted over a computer-readable transmission medium, such as a carrier wave, and received and implemented in general-use or special-purpose digital computers that execute the programs. Moreover, while not required in all exemplary embodiments, one or more units of the above-described apparatuses and devices can include a processor or microprocessor executing a computer program stored in a computer-readable medium, such as a local storage.

The foregoing exemplary embodiments and advantages are merely exemplary and are not to be construed as limiting the present inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   an image processor which processes a non-photorealistic rendering (NPR) with respect to an image; and
   a display unit which displays the NPR-processed image,
   wherein pixels of the image have respective brightness values, and
   wherein the image processor processes the NPR by reducing a brightness value of each pixel, among pixels of the image, having a brightness value less than a predetermined brightness value and increasing a brightness value of each pixel, among the pixels of the image, having a brightness value greater than the predetermined brightness value,
   wherein the image processor performs quantization so that the image is made up of a plurality of brightness levels for generating the NPR-processed image, and
   wherein the quantization comprises quantizing the image by using a first gamma curve corresponding to a first level section of the plurality of brightness levels and a second gamma curve corresponding to a second level section of the plurality of brightness levels.

2. The display apparatus as claimed in claim 1, wherein the image processor reduces the brightness value of the pixel having the brightness value less than the predetermined brightness value and increases the brightness value of the pixel having the brightness value greater than the predetermined brightness value using an S-curve that is based on the predetermined brightness value.

3. The display apparatus as claimed in claim 1, wherein the image processor determines the predetermined brightness value according to an average brightness value of a frame of the image.

4. The display apparatus as claimed in claim 1, wherein the image processor increases at least one of a contrast value and a saturation value of the image by reducing the brightness value of the pixel having the brightness value less than the predetermined brightness value and increasing the brightness value of the pixel having the brightness value greater than the predetermined brightness value.

5. The display apparatus as claimed in claim 1, wherein the image processor comprises:
   a bilateral filter which filters the image to abstract the image;
   an S-curve unit which applies an S-curve to the image so that a brightness value of a pixel, among pixels of the filtered image, having a brightness value less than the predetermined brightness value is reduced and a brightness value of a pixel, among pixels of the filtered image, having the brightness value greater than the predetermined brightness value is increased;

a quantization unit which quantizes the S-curve applied image so that the S-curve applied image comprises a plurality of brightness levels; and an edge processor which extracts an edge image from the S-curve applied image and adds the extracted edge image to the quantized image, wherein the point where the S-curve crosses the identity line is based on the predetermined brightness value.

6. The display apparatus as claimed in claim 5, wherein the quantization unit quantizes the S-curve applied image by using a gamma curve corresponding to each level section of the plurality of brightness levels.

7. The display apparatus as claimed in claim 5, wherein the quantization unit quantizes the S-curve applied image by applying a quantization curve according to:

$$Y = 2^Q \times (MOD(X, 2^Q)/2^Q)^\gamma + FLOOR(X/2^Q),$$

where X is an input signal (Iin(x)), Y is an output signal (Iout(x)), Q is a quantization factor, γ is a gamma value for determining a gamma curve of each section, MOD (A,B) is a function for calculating a remainder of A/B, and FLOOR (C) is a function for making an integer by rounding down below the decimal point.

8. The display apparatus as claimed in claim 5, wherein the edge processor adjusts a strength of an edge by applying a weight set by a user.

9. The display apparatus as claimed in claim 5, wherein the edge processor adjusts a strength of an edge according to a brightness of the image prior to the processing by the image processor.

10. The display apparatus as claimed in claim 5, wherein the edge processor applies a weight to an edge and adjusts a strength of the edge according to a brightness of the image prior to the processing by the image processor, by applying to the extracted edge image:

$$Y = X \times (LV_{max} - w_e \times E)/LV_{max},$$

where X is an input signal (Iin(x)), Y is an output signal (Iout(x)), $LV_{max}$ is a maximum level value of the input and the output signal, $w_e$ is a weight for adjusting the edge strength, and E is an edge greater than a threshold.

11. A computer implemented non-photorealistic rendering (NPR) processing method, comprising:

processing an NPR with respect to an image; and displaying the NPR-processed image, wherein pixels of the image have respective brightness values, and wherein the processing the NPR comprises reducing a brightness value of each pixel, among pixels of the image, having a brightness value less than a predetermined brightness value and increasing a brightness value of each pixel, among the pixels of the image, having a brightness value greater than the predetermined brightness value, wherein the processing the NPR further comprises performing quantization so that the image is made up of a plurality of brightness levels for generating the NPR-processed image, and wherein the quantization comprises quantizing the image by using a first gamma curve corresponding to a first level section of the plurality of brightness levels and a second gamma curve corresponding to a second level section of the plurality of brightness levels.

12. The computer implemented NPR processing method as claimed in claim 11, wherein the reducing the brightness and the increasing the brightness comprises processing the NPR using an S-curve which is based on the predetermined brightness value so that the brightness value of the pixel having the brightness value less than the predetermined brightness value is reduced and the brightness value of the pixel having the brightness value greater than the predetermined brightness value is increased.

13. The computer implemented NPR processing method as claimed in claim 11, wherein the processing the NPR further comprises determining the predetermined brightness value according to an average brightness value of a frame of the image.

14. The computer implemented NPR processing method as claimed in claim 11, wherein the reducing the brightness and the increasing the brightness comprises increasing at least one of a contrast value and a saturation value of the image by reducing the brightness value of the pixel having the brightness value less than the predetermined brightness value and increasing the brightness value of the pixel having the brightness value greater than the predetermined brightness value.

15. The computer implemented NPR processing method as claimed in claim 11, wherein the processing the NPR further comprises:

bilateral-filtering the image to abstract the image;

applying an S-curve to the filtered image so that a brightness value of a pixel, among pixels of the filtered image, having a brightness value less than the predetermined brightness value is reduced and a brightness value of a pixel, among the pixels of the filtered image, having a brightness value greater than the predetermined brightness value is increased;

quantizing the image so that the S-curve applied image comprises a plurality of brightness levels; and processing an edge by extracting an edge image from the S-curve applied image and adding the extracted edge image to the quantized image, wherein the point where the S-curve crosses the identity line is based on the predetermined brightness value.

16. The computer implemented NPR processing method as claimed in claim 15, wherein the quantizing quantizes the S-curve applied image by using a gamma curve corresponding to each level section of the plurality of brightness levels.

17. The computer implemented NPR processing method as claimed in claim 15, wherein the quantizing comprises quantizing the S-curve applied image by applying a quantization curve according to:

$$Y = 2^Q \times (MOD(X, 2^Q)/2^Q)^\gamma + FLOOR(X/2^Q),$$

where X is an input signal (Iin(x)), Y is an output signal (Iout(x)), Q is a quantization factor, γ is a gamma value for determining a gamma curve of each section, MOD (A,B) is a function for calculating a remainder of A/B, and FLOOR (C) is a function for making an integer by rounding down below the decimal point.

18. The computer implemented NPR processing method as claimed in claim 15, wherein the processing the edge comprises adjusting a strength of the edge by applying a weight set by a user.

19. The computer implemented NPR processing method as claimed in claim 15, wherein the processing the edge adjusts a strength of the edge according to a brightness of the image prior to the processing.

20. The computer implemented NPR processing method as claimed in claim 15, wherein the processing the edge comprises applying a weight to the edge and adjusting a strength of the edge according to a brightness of the image prior to the processing, by applying to the extracted edge image:

$$Y = X \times (LV_{max} - w_e \times E)/LV_{max},$$

where X is an input signal (Iin(x)), Y is an output signal (Iout(x)), $LV_{max}$ is a maximum level value of the input and the output signal, $w_e$ is a weight for adjusting the edge strength, and E is an edge greater than a threshold.

21. The computer implemented NPR processing method as claimed in claim 11, wherein the processing the NPR further comprises:
bilateral-filtering the image to abstract the image;
applying an S-curve to the filtered image so that a brightness value of a pixel, among pixels of the filtered image, having a brightness value less than the predetermined brightness value is reduced and a brightness value of a pixel, among the pixels of the filtered image, having a brightness value greater than the predetermined brightness value is increased; and
quantizing the image so that the S-curve applied image comprises a plurality of brightness levels.

22. A computer implemented non-photorealistic rendering (NPR) processing method, comprising:
processing an NPR with respect to an image; and
outputting the NPR-processed image to be displayed,
wherein pixels of the image have respective brightness values,
wherein the processing the NPR comprises reducing a brightness value of each pixel, among pixels of the image, having a brightness value less than a predetermined brightness value and increasing a brightness value of each pixel, among the pixels of the image, having a brightness value greater than the predetermined brightness value,
wherein the processing the NPR further comprises performing quantization so that the image is made up of a plurality of brightness levels for generating the NPR-processed image, and
wherein the quantization comprises quantizing the image by using a first gamma curve corresponding to a first level section of the plurality of brightness levels and a second gamma curve corresponding to a second level section of the plurality of brightness levels.

23. A non-transitory computer readable recording medium having recorded thereon a program executable by a computer for performing the method of claim 11.

24. A non-transitory computer readable recording medium having recorded thereon a program executable by a computer for performing the method of claim 22.

* * * * *